Figures 1, 2:
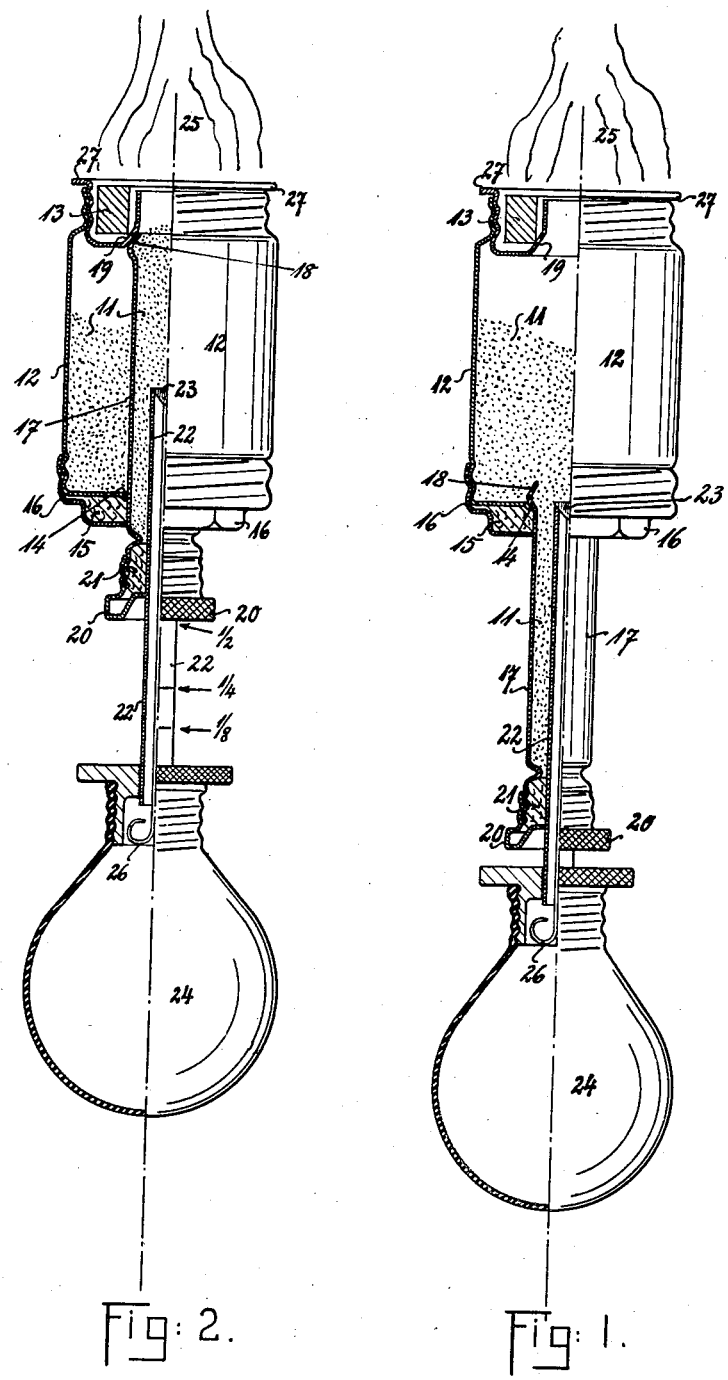

May 14, 1940.   G. WERNER   2,200,350
REPEATING PHOTOGRAPHIC FLASHLIGHT
Filed Aug. 11, 1937

INVENTOR.

Patented May 14, 1940

2,200,350

UNITED STATES PATENT OFFICE 2,200,350

REPEATING PHOTOGRAPHIC FLASHLIGHT

Guenther Werner, Peiping, China, assignor to Gerhard Von Hessert, New York, N. Y.

Application August 11, 1937, Serial No. 158,446
In Germany August 11, 1936

2 Claims. (Cl. 67—32)

This invention concerns improvements in flashlight apparatus for photographic purposes, and more particularly in means for measuring a charge of flashpowder within the apparatus which also provides a repeating device so that the flashlight may be used many times in quick succession. There are flashlights which produce the flash by blowing flashpowder through a flame, but no means has as yet been provided for exactly regulating by mechanical means the variant charges to be so blown. It is true that other lamps do exactly measure one charge—the maximum—but my purpose is to provide a repeating lamp that will measure with accuracy any charge from the maximum to the minimum, providing a lamp which may be used with certainty under all varying conditions.

In the accompanying drawing Figure 1 is a partly cross-sectioned elevation of the device showing the manner in which it is operated, and Figure 2 is a partly cross-sectioned elevation of the device ready for discharge.

In the drawing 12 is a container or magazine, which is filled with flashpowder 11. Mounted on the screw-top 27 which may be removed to fill the container is a ring of solid alcohol or other similar fuel 13 which is lit to provide a flame 25 to ignite the charge of flashpowder when it is blown through the flame 25. The bottom of the container 12 has an aperture 14 provided with a stuffing nut 16 and packing 15 through which is introduced the sliding measuring tube 17, having a lip 18 at its upper end which prevents its withdrawal through the aperture 14 and fits into the conical aperture 19 at the top of the container 12. This tube 17 has a stuffing nut 20 and packing 21 at its lower end, through which is introduced the slidable blowpipe 22 provided with a conical faced poppet valve 23 at its upper end and a rubber bulb 24 at its lower end. The poppet valve 23 is kept in place by the looped wire 26. The blowpipe 22 is marked throughout its length with annular markings and figures stating the fractional amounts of the maximum charge which can be discharged. These marks are read against the lower side of the stuffing nut 20.

The charge to be used is the amount of powder occupying the space in the measuring tube 17 between its lip 18 and the top of the blowpipe 22. The farther the blowpipe 22 is drawn out from the measuring tube 17 the greater the charge will be. Thus in Figure 2 the device is shown set to discharge ½ the maximum charge and in Figure 1 to discharge the minimum charge. The blowpipe 22 having been set to measure a desired charge the measuring tube 17 is drawn down through the container 12, as shown in Figure 1, and so filled with flashpowder, and then returned until its upper lip 18 is seated in the conical aperture 19 as shown in Figure 2. It may easily be determined by the markings of the blowpipe 22 what amount of flashpowder lies between the top of the tube 17 and the blowpipe 22. The poppet valve functions to prevent flashpowder accumulating in the rubber bulb 24 and by its shape disperses the air expelled from the bulb 24 among the particles as they rise, so that they pass into the flame 25 above in a diffused cloud.

I claim:

1. In a flashlight apparatus having a flame through which flashpowder is projected by air pressure and provided with a container for flashpowder, a tube slidably retained within said container, having slidably retained within said tube a second calibrated tube provided at its lower end with pneumatic blow means.

2. In a flashlight apparatus having a flame through which flashpowder is projected by air pressure and provided with a container for flashpowder, the combination of a tube slidably retained within said container, a second calibrated tube slidably retained within the said first tube, a poppet valve at the upper end of such second tube and a rubber pneumatic bulb attached to the lower end of said second tube.

GUENTHER WERNER.